(12) United States Patent
Gao et al.

(10) Patent No.: US 9,859,834 B2
(45) Date of Patent: Jan. 2, 2018

(54) SLACK COMPENSATOR

(71) Applicant: GM GLOBAL TECHNOLOGY OPERATIONS LLC, Detroit, MI (US)

(72) Inventors: Xiujie Gao, Troy, MI (US); Christopher B. Churchill, Ann Arbor, MI (US); Guillermo A. Herrera, Winnetka, CA (US); Andrew C. Keefe, Encino, CA (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 75 days.

(21) Appl. No.: 15/016,990

(22) Filed: Feb. 5, 2016

(65) Prior Publication Data

US 2017/0229990 A1    Aug. 10, 2017

(51) Int. Cl.
| | |
|---|---|
| *H02K 41/00* | (2006.01) |
| *H02P 1/00* | (2006.01) |
| *H02P 3/00* | (2006.01) |
| *H02P 5/00* | (2016.01) |
| *H02P 25/06* | (2016.01) |
| *F03G 7/06* | (2006.01) |

(52) U.S. Cl.
CPC .............. *H02P 25/06* (2013.01); *F03G 7/065* (2013.01)

(58) Field of Classification Search
CPC .................................. F03G 7/065; H02P 25/06
USPC ..................................... 318/135; 60/528–529
See application file for complete search history.

(56) References Cited

U.S. PATENT DOCUMENTS

| | | |
|---|---|---|
| 2,323,352 A | 7/1943 | Pitts |
| 7,299,630 B2 | 11/2007 | Browne et al. |
| 7,548,010 B2 | 6/2009 | Browne et al. |
| 8,104,793 B2 | 1/2012 | Browne et al. |
| 8,109,087 B2 | 2/2012 | Usoro et al. |
| 8,188,757 B2 | 5/2012 | Herrera et al. |
| 8,281,585 B2 | 10/2012 | Gao et al. |
| 8,388,773 B2 | 3/2013 | Luntz et al. |
| 8,390,305 B2 | 3/2013 | Herrera et al. |
| 8,567,188 B2 | 10/2013 | Mankame et al. |
| 8,656,713 B2 | 2/2014 | Browne et al. |
| 8,661,810 B2 | 3/2014 | Browne et al. |
| 8,733,097 B2 | 5/2014 | Mankame et al. |
| 8,739,525 B2 | 6/2014 | Mankame et al. |
| 8,741,076 B2 | 6/2014 | Gao et al. |
| 8,744,603 B2 | 6/2014 | Gao et al. |
| 8,766,564 B2 | 7/2014 | Gao et al. |
| 8,773,835 B2 | 7/2014 | Johnson et al. |
| 8,797,703 B2 | 8/2014 | Browne |

(Continued)

FOREIGN PATENT DOCUMENTS

| | | |
|---|---|---|
| CN | 103677076 B | 1/2017 |
| DE | 102013216655 A1 | 3/2014 |

*Primary Examiner* — Erick Glass
(74) *Attorney, Agent, or Firm* — Harness, Dickey & Pierce, P.L.C.

(57) ABSTRACT

A slack compensator includes a stator fixedly attachable to a base and a shuttle. The shuttle is selectably movable from a first position on the stator to a second position on the stator. The shuttle is selectably releasably attached to the stator in the first position. The shuttle is to be permanently captured upon reaching the second position. The slack compensator is attachable to an SMA wire for removing slack that develops in the SMA wire during a plurality of break-in cycles.

8 Claims, 6 Drawing Sheets

(56) References Cited

U.S. PATENT DOCUMENTS

| | | |
|---|---|---|
| 8,804,294 B2 | 8/2014 | Browne |
| 8,810,234 B2 | 8/2014 | Gao et al. |
| 8,850,901 B2 | 10/2014 | Mankame et al. |
| 8,857,273 B2 | 10/2014 | Mankame et al. |
| 8,947,099 B2 | 2/2015 | Gao et al. |
| 8,972,032 B2 | 3/2015 | Hao et al. |
| 9,021,801 B2 | 5/2015 | Gao et al. |
| 9,067,526 B2 | 6/2015 | Browne et al. |
| 9,157,398 B2 | 10/2015 | Browne et al. |
| 9,234,509 B2 | 1/2016 | Mankame et al. |
| 9,316,212 B2 | 4/2016 | Browne et al. |
| 2005/0230195 A1 | 10/2005 | Jones et al. |
| 2005/0263359 A1 | 12/2005 | Mankame et al. |
| 2007/0137196 A1* | 6/2007 | Hamaguchi .............. G03B 5/00 60/527 |
| 2008/0141736 A1 | 6/2008 | Jones et al. |
| 2011/0279916 A1* | 11/2011 | Brown .................... F03G 7/065 359/823 |
| 2012/0046791 A1 | 2/2012 | Gao et al. |
| 2012/0065744 A1 | 3/2012 | Brammajyosula et al. |
| 2012/0109573 A1 | 5/2012 | Gao et al. |
| 2012/0190573 A1 | 7/2012 | Gomperts et al. |
| 2013/0000206 A1 | 1/2013 | O'Kane et al. |
| 2013/0042718 A1 | 2/2013 | Browne et al. |
| 2013/0199172 A1* | 8/2013 | Strom .................... F03G 7/065 60/527 |
| 2013/0205770 A1 | 8/2013 | Browne et al. |
| 2013/0239565 A1 | 9/2013 | Browne et al. |
| 2013/0240096 A1 | 9/2013 | Browne et al. |
| 2014/0060036 A1* | 3/2014 | Gao ........................ F01P 7/10 60/527 |
| 2014/0096516 A1* | 4/2014 | Browne .................... F03G 7/06 60/528 |
| 2014/0225708 A1 | 8/2014 | Usoro |

\* cited by examiner

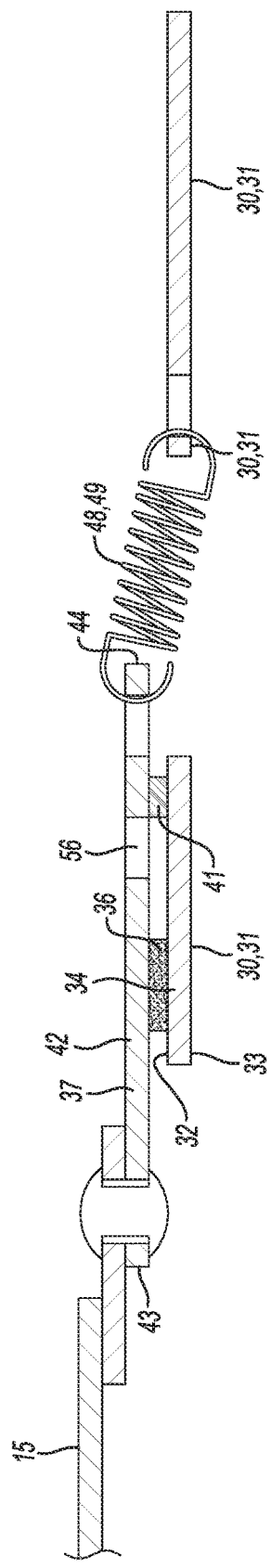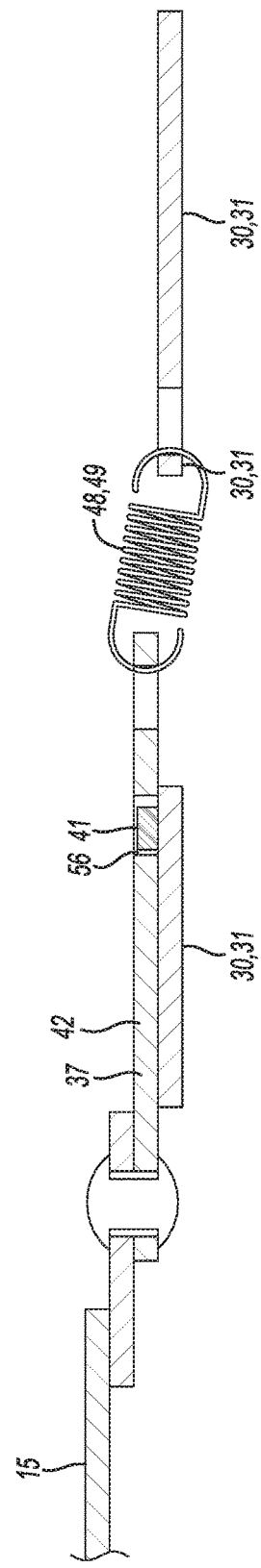

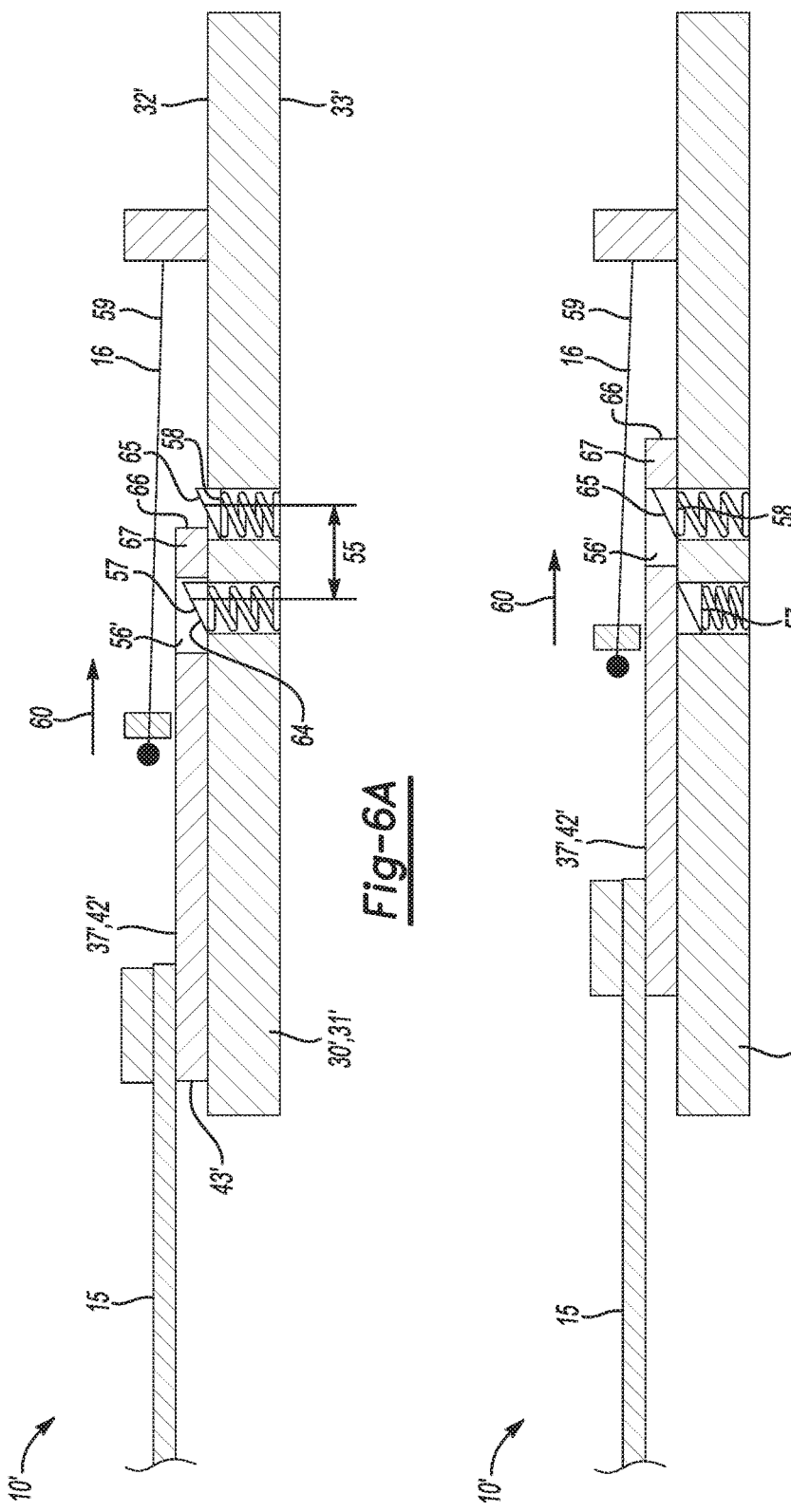

SLACK COMPENSATOR

TECHNICAL FIELD

The present disclosure relates generally to shape memory alloy actuators, and more particularly to a device to compensate for irreversible elongation that may occur in a shape memory alloy member.

BACKGROUND

Some mechanical devices may be configured to have two discrete states with a respective associated operating position corresponding to each of the two states. The mechanical devices may be repeatedly cycled between the two states. For example, the two states may be designated as off/on, open/closed, extended/retracted, engaged/disengaged or some similar terminology.

Automobiles may include Shape Memory Alloy (SMA) actuators to operate such mechanical devices. SMA actuators may be a relatively simple, low mass alternative for fractional horsepower electric motors or similar electromechanical devices. SMA actuators take advantage of the ability of Shape Memory Alloys to repeatedly cycle between two positions as, for example, in a retractable air dam, a latch and a clutch, or to repeatedly cycle over a range of positions intermediate between predetermined limits, as for example in an adjustable louver array, a rearview or side mirror or a sun visor.

SUMMARY

A slack compensator includes a stator fixedly attachable to a base and a shuttle. The shuttle is selectably movable from a first position on the stator to a second position on the stator. The shuttle is selectably releasably attached to the stator in the first position. The shuttle is to be permanently captured upon reaching the second position. The slack compensator is attachable to an SMA wire for removing slack that develops in the SMA wire during a plurality of break-in cycles.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 4A is a side cross-sectional view of the slack compensator depicted in FIG. 3 before the slack compensator has been activated;

FIG. 4B is a side cross-sectional view of the slack compensator depicted in FIG. 3 after the slack compensator has been activated;

FIG. 6A is a side cross-sectional view of the slack compensator depicted in FIG. 5 before the slack compensator has been activated;

FIG. 6B is a side cross-sectional view of the slack compensator depicted in FIG. 5 after the slack compensator has been activated;

DETAILED DESCRIPTION

Figure 1:
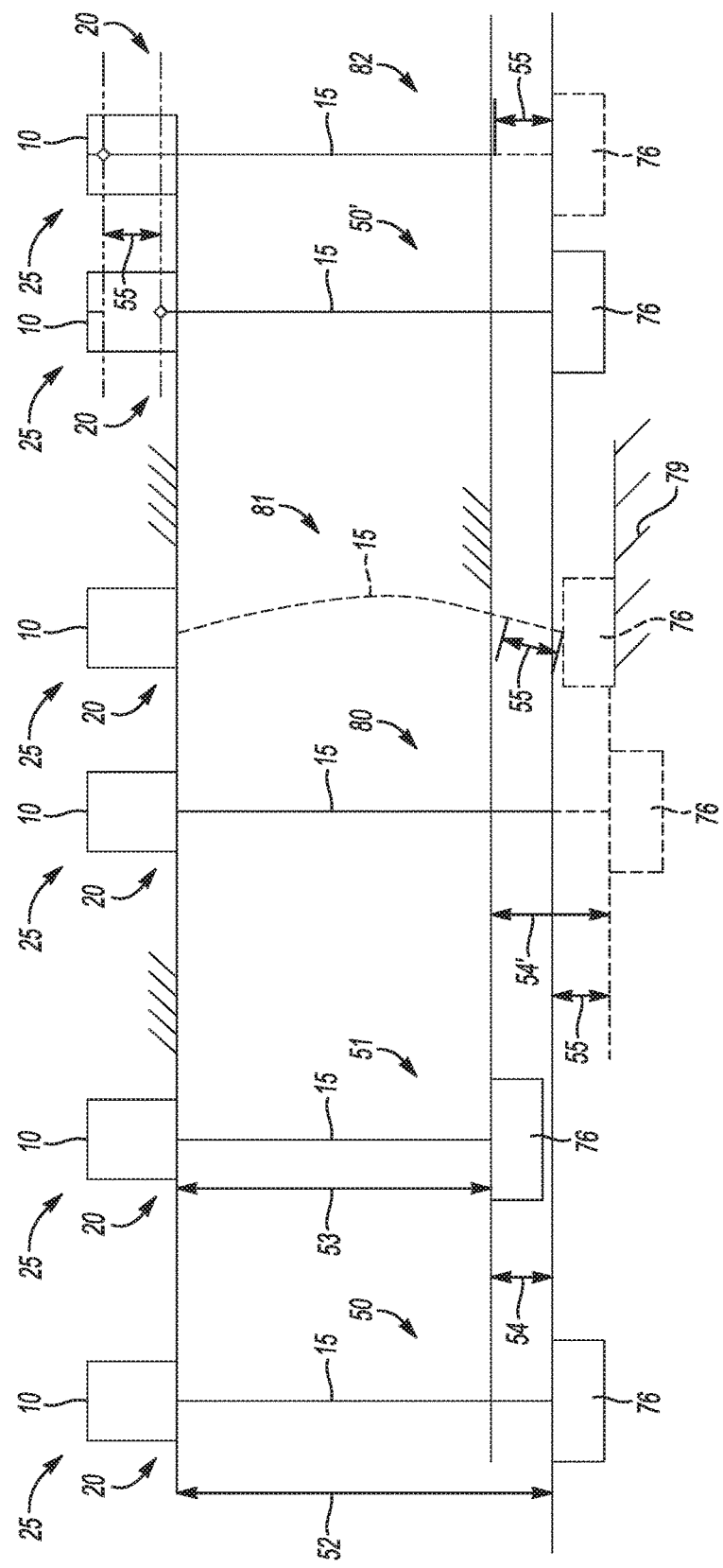
FIG. 1 is a series of schematic diagrams of an example of a device operated by an SMA actuator that has a slack compensator according to an example of the present disclosure.

Shape Memory Alloys (SMAs) are alloys which undergo substantially reversible transformation between two crystal phases—a low temperature phase known as martensite and a high temperature phase known as austenite. The particular phase transformation temperature varies with the alloy system, but generally ranges from about −100° C. to about +150° C. Some SMAs exist in their lower temperature, martensitic, phase at about 25° C., and transform to their higher temperature, austenitic, phase at temperatures ranging from about 60° C. to about 80° C. Shape memory behavior has been observed in a large number of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn but only a few of these alloys are commercially available. Nitinol, an alloy of nickel and titanium in near-equiatomic proportion, is an example of a commercially available SMA.

SMAs may be preformed into a wire or similar elongated form such as a tape, chain, cable and braid among others. The term "SMA wire" is used herein to represent any of the elongated forms in which SMAs may be formed.

SMA actuators may include an SMA that may forcibly shrink or shorten in length when heated. The force generated by such SMA actuators may be powerful enough to operate a device even when some mechanical obstruction or other resistance is encountered.

An SMA wire may be first shaped in the SMA wire's austenitic phase to the desired form; next, the SMA wire is cooled to ambient temperature, resulting in the SMA wire adopting the martensite crystal structure. While in the martensitic phase the SMA wire is stretched and deformed to its intended predetermined length. The deformation exceeds the maximum allowable elastic strain which may be imposed on the SMA wire, and may be termed pseudo-plastic deformation. The pseudo-plastically deformed martensitic SMA wire is in the appropriate starting condition for the SMA actuator. Strain is the change in length of the SMA wire divided by its original or base length. The strain applied during such pseudo-plastic deformation does not exceed 7% and may be about 5% or less. As used herein, the base length, to which all length changes are referred, is the length of the SMA wire in the high temperature, austenitic phase.

After being suitably deformed in the martensitic phase, the SMA wire may, when heated and transformed to austenite, spontaneously revert to the original, undeformed shape. In changing shape, the SMA wire will contract by an amount substantially equal to the pseudo-plastic strain previously applied when the wire was in the martensitic phase. As an example, an SMA wire specimen having a length of about 10 centimeters (cm), prestrained to about 5% strain, may enable a total displacement of about 0.5 cm. The tensile force available from contraction of an SMA wire is directly related to the wire diameter. A large diameter SMA wire can produce a greater tensile force than a smaller diameter SMA wire of the same length and material composition. Smaller diameter SMA wires may cool faster than larger diameter SMA wires. Faster cooling of an SMA wire can allow a faster transition from the austenitic phase to the martensitic phase.

An SMA actuator's action may be reversed by discontinuing heating and allowing the SMA wire to cool and revert to the SMA wire's martensitic crystal structure. During cooling the SMA wire will not spontaneously change its length to the SMA wire's initial deformed length. However, in the martensitic phase, the SMA wire may be readily stretched again to the SMA wire's initial predetermined length. A spring, or other biasing element, in series with the SMA wire may be connected to the SMA wire to deform the SMA wire when the SMA is in its less strong martensitic phase. When the austenitic wire cools and reverts to its martensitic phase, the SMA wire may be stretched by the spring to its initial length so that the extension-contraction cycle may be repeated. If the transition in crystal structure were fully reversible, the cycle of extending and contracting the SMA wire by application of suitable stimulus (e.g., heat) could theoretically continue indefinitely.

In real SMA actuators, however, the phase transitions and accompanying cyclic length changes are not completely reversible, and some irrecoverable deformation occurs. These cycle-by-cycle irreversibilities accumulate over repeated cycles to permanently extend the SMA wire. This permanent extension of the SMA wire may introduce slack into the initially-taut wire and both reduce the stroke obtainable from the SMA actuator and render operation of the SMA actuator non-linear. The reduced stroke and nonlinearity may be sufficient to cause the SMA actuator without a slack compensator to malfunction or render the SMA actuator inoperative.

The irreversible plastic deformation of the SMA wire makes the contracted length longer and therefore reduces the effective stroke of the SMA actuator as operational cycles accrue. If the SMA actuator no longer produces the required stroke, then the SMA actuator has reached the end of its operational life. As some SMA wires age (accrue operational cycles) the aging SMA wires may be stimulated to achieve the required stroke by heating SMA wire to a much higher temperature. The additional heating to produce additional stroke may reduce the mechanical fatigue life of the SMA wire.

FIG. 1 schematically depicts a device 25 operated by an SMA actuator 20. The SMA actuator 20 has an SMA wire 15 to move a movable component 76 of the device 25. The original martensitic state of the SMA wire 15 having an extended length 52 is indicated at reference numeral 50. The original austenitic state of the SMA wire 15 having a contracted length 53 is indicated at reference numeral 51. The stroke length 54 is the difference between the extended length 52 and the contracted length 53. During a plurality of break-in cycles, the irreversible plastic deformation accumulates in the SMA wire 15. As depicted at reference numeral 80, after the plurality of break-in cycles, the extended length 52 is increased by a developed slack length 55. In order to move the movable component 76 to the same location that the SMA wire 15 was capable of achieving in the martensitic state (see reference numeral 51), the stroke 54' of the SMA wire 15 must be increased. In some cases, the stroke of the SMA wire 15 may be increased by raising the temperature, with fatigue life trade-offs.

As shown at reference numeral 81, a hard stop 79 may be used to limit the movement of the movable component 76. As shown at reference numeral 81, the developed slack length 55 can cause slack in the SMA wire 15.

More detail of the slack compensator 10 is schematically shown at reference numeral 50' in FIG. 1. Reference numeral 50' indicates the SMA wire 15 in the original martensitic state. At reference numeral 82, the slack compensator 10 has taken up the developed slack length 55, so the movable component 76 is in the same position that the movable component 76 was originally in with the SMA wire 15 in the martensitic state.

Figure 2:
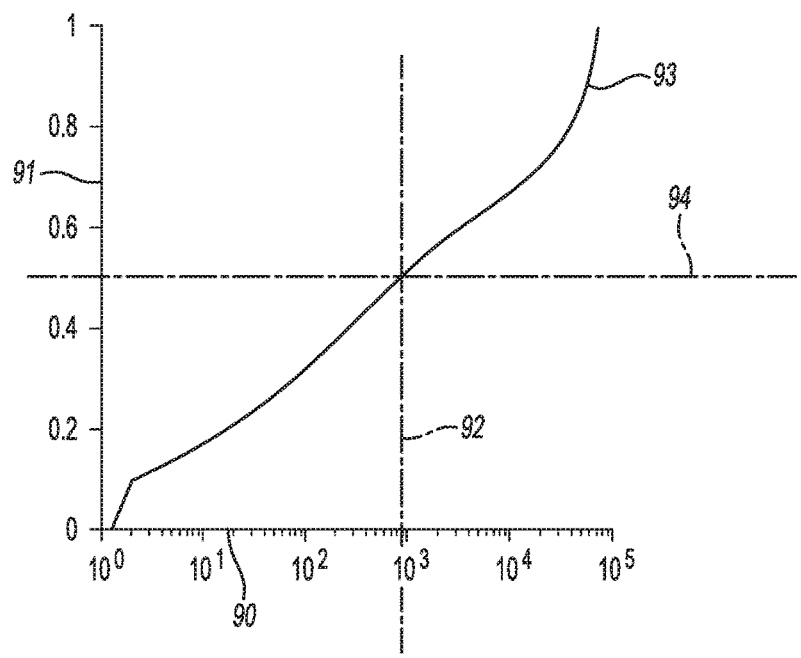
FIG. 2 is a graph depicting accumulation of irreversible plastic deformation in an example of an SMA wire over the number of operational cycles of the SMA wire.

As depicted in FIG. 2, irreversible plastic deformation accumulates rapidly in SMA wires during the first few break-in cycles then builds much more slowly over the remaining life of the SMA wire. Curve 93 represents information taken from fatigue testing of SMA wires. In FIG. 2, the number of operational cycles is depicted on the abscissa 90 and the fraction of accumulated irreversible plastic deformation is depicted on the ordinate axis 91. The break-in cycles occur to the left of the vertical phantom line 92. The horizontal phantom line 94 depicts 50 percent of the irreversible plastic deformation. As depicted in FIG. 2, evolution of plastic strain is approximately log-linear for most of the operational life of the SMA wire. In the example depicted in FIG. 2, more than half of the deformation happens in the first 1% of the operational life of the SMA wire. It is believed that using examples of the slack compensator 10 as disclosed herein may extend the operational life of the SMA wire beyond what is shown in FIG. 2. In examples of the present disclosure, the operational and fatigue life of an SMA actuator can be improved by taking up the irreversible plastic deformation once, after the break-in cycles. Examples of the present disclosure mitigate the effects of the irreversible plastic deformation and thereby bring the benefits of longer fatigue life, smaller package, and extended operational life to SMA actuators.

Figure 3:
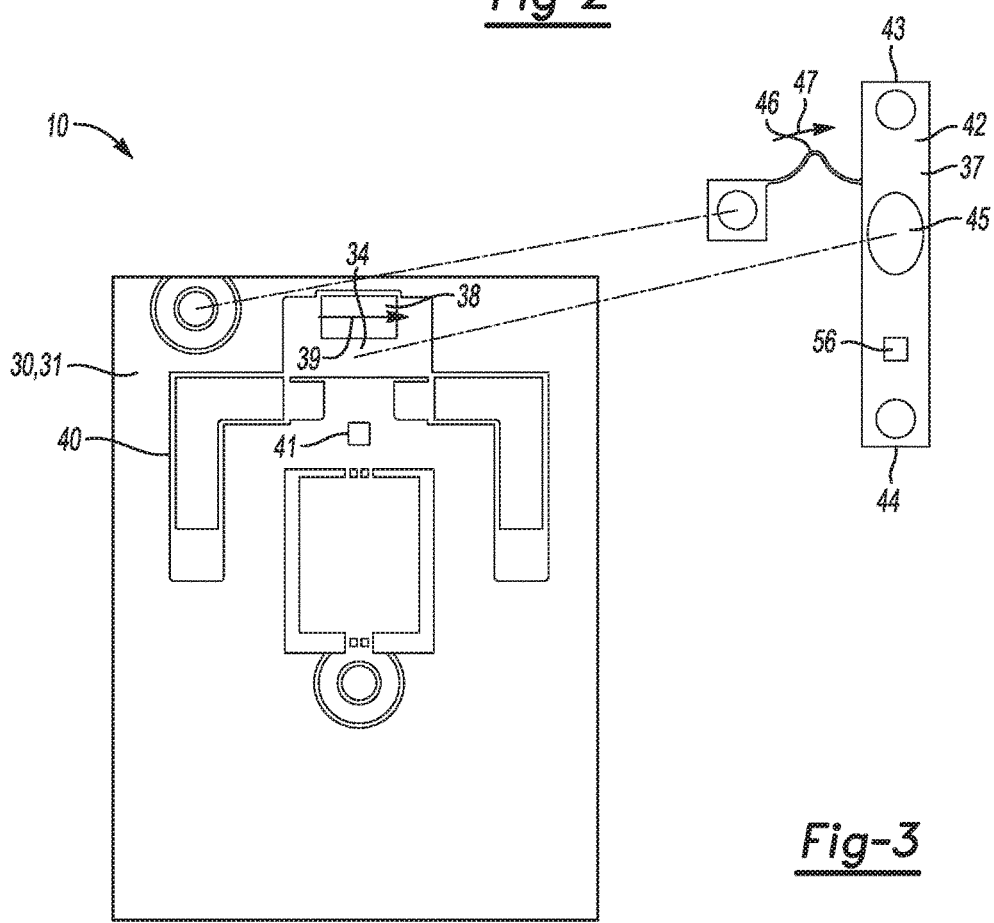
FIG. 3 is an exploded plan view of an example of a slack compensator according to the present disclosure.

FIG. 3 is an exploded plan view of an example of a slack compensator 10 according to the present disclosure. As depicted in FIG. 3, the slack compensator 10 includes a stator 30 fixedly attachable to a base 35 (see FIG. 7A). The base 35 is a mounting location on the SMA actuator 20. As shown in FIG. 4A and FIG. 4B, a shuttle 37 is selectably movable from a first position (see FIG. 4A) on the stator 30 to a second position (see FIG. 4B) on the stator 30. The shuttle 37 is selectably releasably attached to the stator 30 in the first position (see FIG. 4A). The shuttle 37 is to be permanently captured upon reaching the second position (see FIG. 4B). As used herein, "permanently captured" means captured such that release from the captured state cannot be achieved without removing the slack compensator 10 from the SMA actuator 20. In other words, the permanently captured shuttle 37 is not automatically resettable to the first position (see FIG. 4A) once the second position (see FIG. 4B) has been reached. However, it may be possible to disassemble the SMA actuator 20 and rebuild the slack compensator 10. The slack compensator 10 is attachable to an SMA wire 15 (see, for example, FIG. 1) for removing slack 15 that develops in the SMA wire 15 during a plurality of break-in cycles.

In examples of the present disclosure, the SMA wire 15 is cyclable between a martensitic state (see, e.g., reference numeral 50 in FIG. 1) and an austenitic state (see, e.g., reference numeral 51 in FIG. 1). The SMA wire 15 in the martensitic state (reference numeral 50) has an extended length 52. The SMA wire 15 in the austenitic state (reference numeral 51) has a contracted length 53 shorter than the extended length 52 by a stroke length 54. Reference numeral 80 indicates the SMA wire 15 in the martensitic state after the plurality of break-in cycles. As depicted at reference numeral 80, the extended length 52 is to increase by a developed slack length 55 in response to the plurality of break-in cycles of the SMA wire 15. In examples, the total number of break-in cycles in the plurality of break-in cycles may be from about 3 break-in cycles to about 5000 break-in cycles. In other examples, the total number of break-in cycles may be from about 10 break-in cycles to about 900 break-in cycles. A break-in cycle is an operational cycle beginning with the first operational cycle of the SMA wire 15 and continuing for a predetermined number of operational cycles. At the end of the plurality of break-in cycles the developed slack length 55 has been achieved. Determining that the developed slack length 55 has been achieved may be in response to an electrical signature (resistance history) of the SMA wire 15, to the timing of the SMA actuator response, some external measurement of tension in the SMA wire 15, or a counter which waits for plurality of break-in cycles to elapse. The number of operational cycles to be included as break-in cycles may be empirically determined, or predicted based on characteristics of the SMA wire 15. It may not be necessary to measure the developed slack length 55 in each instance of the SMA wire 15, since SMA wires tend to have consistent operational characteristics from specimen to specimen.

In the example of the slack compensator 10 depicted in FIG. 3, FIG. 4A and FIG. 4B, the stator 30 includes a printed circuit board (PCB) 31. The PCB 31 includes a front side 32 and a back side 33 opposite the front side 32. A solder pad 34 is defined on the front side 32 for having a layer of solder 36 disposed thereon. A resistor 38 is in thermal communication with the solder pad 34. The resistor 38 is to generate heat to melt the layer of solder 36 on the solder pad 34 in response to a releasing current 39 of about 2 Amperes of electrical current being conducted through the resistor 38. A conductive circuit trace 40 is disposed on the PCB 31 to conduct the releasing current 39 of about 2 Amperes of electrical current to the resistor 38. A latch pin 41 is affixed to the PCB 31 to protrude from the front side 32 of the PCB 31 (see FIG. 4A).

In an example, the resistor 38 may be a power resistor, disposed directly adjacent to the solder pad 34. In another example, there may be two or more such power resistors. It should be noted that a higher-temperature solder may be used to attach the power resistor(s) to the PCB 31 and to connect the power resistor(s) to the conductive circuit trace 40. However, since the slack compensator 10 is activated only once, it may not be necessary to use the higher-temperature solder to attach the power resistor(s) to the PCB 31. In an example, an alternative to discrete resistors mounted on the PCB 31 can be a resistive heater pattern internal to the PCB 31. A fine pattern of conductive, resistive traces (not shown) may be disposed on an internal layer of a multi-layer PCB 31 directly below the solder pad 34.

In the example of the slack compensator 10 depicted in FIG. 3, FIG. 4A and FIG. 4B, the shuttle 37 includes a conductive plate 42 having an SMA wire attachment end 43 and a retraction spring attachment end 44. A solder attachment surface 45 on the shuttle 37 is for the layer of solder 36 to selectably releasably bond the shuttle 37 to the stator 30. The shuttle 37 is bonded to the stator 30 in the first position (see FIG. 4A) by the layer of solder 36 when the solder 36 is in a solid state. A flexible electrical conductor 46 is to conduct an SMA activating electrical current 47 to the SMA wire 15 to create Joule heat in the SMA wire 15 and to cause the SMA wire 15 to transition from the martensitic state (see reference numeral 50 in FIG. 1) to the austenitic state (see reference numeral 51 in FIG. 1). The shuttle 37 has an aperture 56 to receive the latch pin 41 when the shuttle 37 is in the second position (see FIG. 4B).

In the example of the slack compensator 10 depicted in FIG. 4A, a retraction spring 48 is connected to the base 35 and to the shuttle 37 at the retraction spring attachment end 44. In the example depicted in FIG. 4A, the retraction spring 48 is an extension spring 49. The retraction spring 48 is to apply tension to the shuttle 37 to urge the shuttle 37 away from the first position (see FIG. 4A) on the stator 30 toward the second position (see FIG. 4B) on the stator 30. The shuttle 37 is releasable from the first position (see FIG. 4A) by applying the releasing current 39 via the conductive circuit trace 40 to melt the solder 36 thereby allowing the shuttle 37 to move to the second position (see FIG. 4B).

Figure 5:
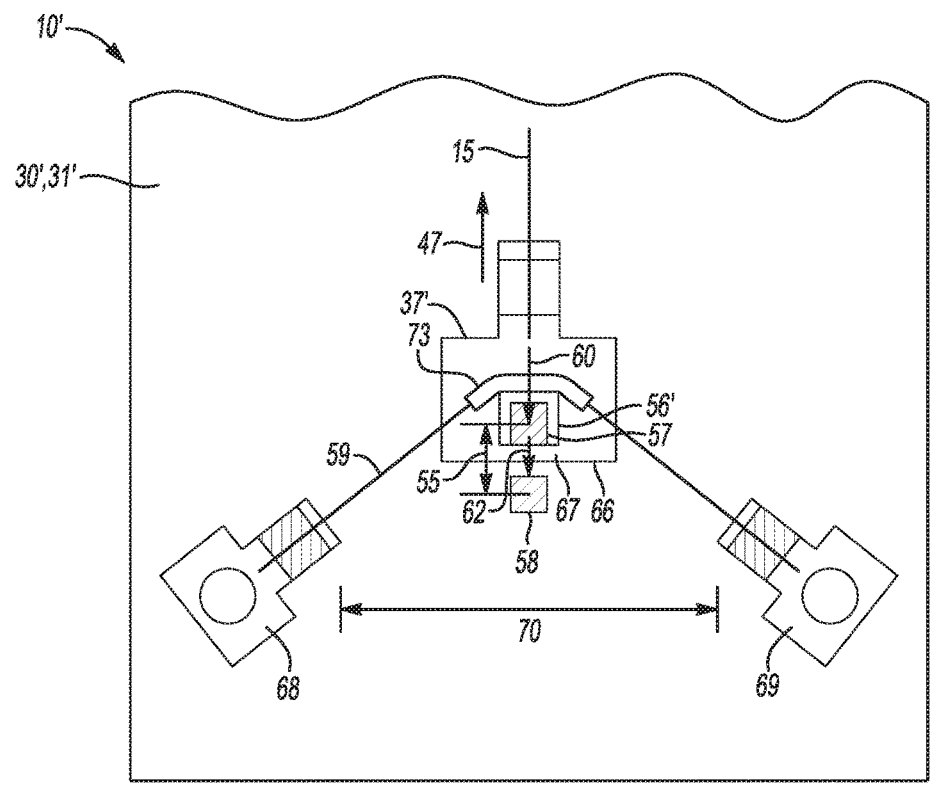
FIG. 5 is an plan view of another example of a slack compensator according to the present disclosure.

In the example of the slack compensator 10' depicted in FIG. 5, FIG. 6A and FIG. 6B, the stator 30' includes a printed circuit board 31'. The printed circuit board 31' includes a front side 32' and a back side 33' opposite the front side 32'. A first latch pin 57 is affixed to the printed circuit board 31' to resiliently protrude from the front side 32' of the printed circuit board 31'. A second latch pin 58 is affixed to the printed circuit board 31' to resiliently protrude from the front side 32' of the printed circuit board 31'. The first latch pin 57 and the second latch pin 58 have centers spaced at the developed slack length 55.

In the example of the slack compensator 10' depicted in FIG. 5, the shuttle 37' includes a conductive plate 42' having an SMA wire attachment end 43'. The conductive plate 42' is to conduct an SMA activating electrical current 47 to the SMA wire 15 to create Joule heat in the SMA wire 15 and to cause the SMA wire 15 to transition from the martensitic state (see reference numeral 50 in FIG. 1) to the austenitic state (see reference numeral 51 in FIG. 1). The SMA activating electrical current 47 may range from about 200 milliamperes (mA) to about 3 Amperes (A). An aperture 56' is to receive the first latch pin 57 when the shuttle 37' is in the first position (see FIG. 6A) and the aperture 56' to receive the second latch pin 58 when the shuttle 37' is in the second position (see FIG. 6B). A retraction wire 59 is mechanically connected to the stator 30' and to the shuttle 37'. The retraction wire 59 includes another SMA wire 16. The other SMA wire 16 is distinct from the SMA wire 15. The retraction wire 59 is to apply a retracting force 60 to the shuttle 37' to urge the shuttle 37' away from the first position (see FIG. 6A) on the stator 30' toward the second position (see FIG. 6B) on the stator 30'. The retracting force 60 is normal to the retraction wire 59 and in a retraction direction 61 defined by a vector 62 from the first latch pin 57 to the second latch pin 58. The shuttle 37' is retractable from the first position (see FIG. 6A) by applying a retracting current 63 to the other SMA wire 16 thereby causing the other SMA wire 16 to contract and to apply the retracting force 60 to move the shuttle 37' to the second position (see FIG. 6B). In the example depicted in FIG. 5, an electrical insulator 73 is disposed between the retraction wire 59 and the shuttle 37' to prevent the retraction wire 59 from establishing electrical contact with the shuttle 37'. In other examples, the electrical insulator 73 is not required because the current path can be controlled by electrically isolating all SMA wire ends with relays, FETs, diodes, etc.

In the example of the present disclosure depicted in FIG. 6A, the first latch pin 57 has a first ramp 64 facing the shuttle 37'. The shuttle 37' engages the first ramp 64 when the retracting force 60 is applied by the retraction wire 59 to the shuttle 37' thereby causing the shuttle 37' to translate toward the second latch pin 58 and causing the aperture 56' to disengage from the first latch pin 57 and causing the shuttle 37' to slide over the first latch pin 57 as depicted in FIG. 6B. The second latch pin 58 has a second ramp 65 facing the shuttle 37' to be engaged by a leading edge 66 of the shuttle 37' and to thereby deflect the second latch pin 58 under a crossmember 67 that defines a portion of the aperture 56'. The crossmember 67 is to engage and to be captured by the second latch pin 58 when the shuttle 37' reaches the second position (see FIG. 6B).

In the example of the present disclosure depicted in FIG. 6A, at least one of the first latch pin 57 and the second latch pin 58 maintains continuous electrical contact with the shuttle 37' to conduct the SMA activating electrical current 47 to the SMA wire 15 when the shuttle 37' is in the first position (see FIG. 6A), the second position (see FIG. 6B), and when the shuttle 37' is translating between the first and second position.

In the example of the slack compensator 10' depicted in FIG. 5, the retraction wire 59 may be attached to the stator 30' by a first electrically conductive lug 68 and a second electrically conductive lug 69. The first electrically conductive lug 68 is spaced apart from the second electrically conductive lug 69 by a distance 70 less than a total length 71 of the retraction wire 59. In other words, the retraction wire 59 is arranged as a bowstring. The other SMA wire 16 has a contraction stroke that is less than the developed slack length 55. The retraction wire 59 causes the shuttle 37' to translate from the first position (see FIG. 6A) to the second position (see FIG. 6B) by activation of the other SMA wire 16 causing contraction of the other SMA wire 16 by the contraction stroke.

Figure 7A:
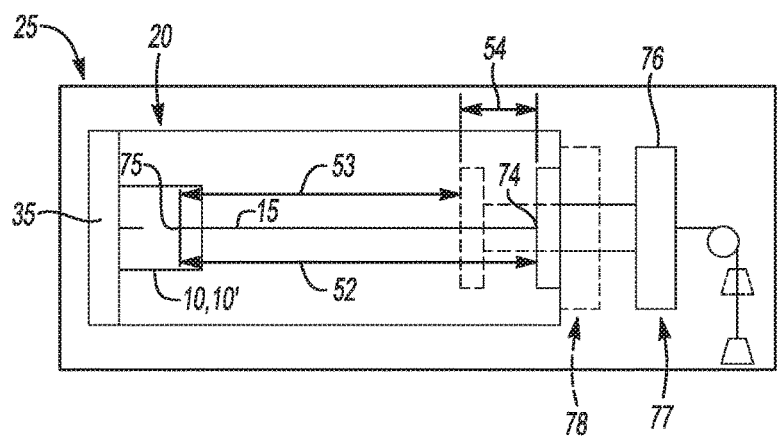
FIG. 7A is a schematic drawing of an example of an SMA actuator for operating a device according to the present disclosure.
Figure 7B:
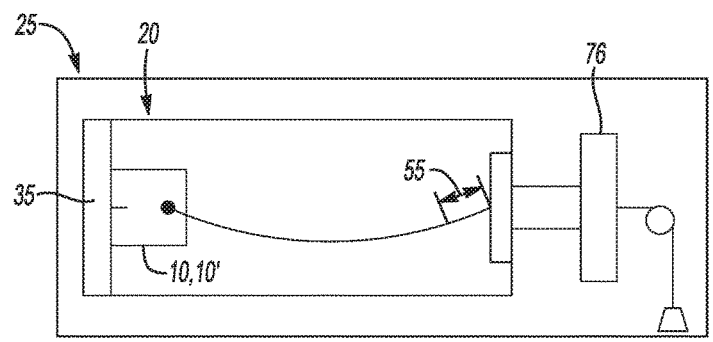
FIG. 7B is a schematic drawing of the example of the SMA actuator depicted in FIG. 7A after the SMA actuator has experienced the plurality of break-in cycles of the SMA wire causing the extended length to increase by a developed slack length before the slack compensator has been activated.
Figure 7C:
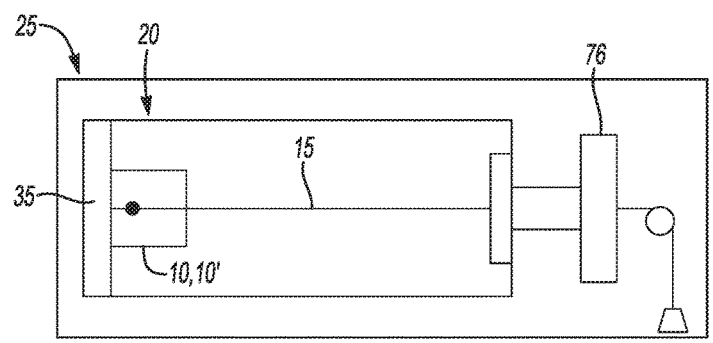
FIG. 7C is a schematic drawing of the example of the SMA actuator depicted in FIG. 7B after the slack compensator has been activated.

FIGS. 7A-7C depict an example of a SMA actuator 20 for operating a device 25 according to the present disclosure. The SMA actuator 20 includes a base 35 and an SMA wire 15 having a first end 74 and a second end 75. The first end 74 is connected to a movable component 76 of the device 25. The SMA wire 15 is to develop slack 55 in the SMA wire 15 during a plurality of break-in cycles. The second end 75 is connected to the base 35 via a slack compensator 10, 10'. The slack compensator 10, 10' is to compensate for the developed slack 55 by drawing the SMA wire 15 taut in a martensitic state as shown in FIG. 7C. The slack compensator 10, 10' is shown schematically in FIGS. 7A-7C. Details of the slack compensator 10, 10' are disclosed herein, for example, in the detailed description of FIG. 3 and FIG. 5.

The SMA actuator 20 is to cause the movable component 76 to move in response to a cycling of the SMA wire 15 between the martensitic state 77 and an austenitic state 78 (depicted in hidden line in FIG. 7A). The SMA wire 15 in the martensitic state 77 has an extended length 52. The SMA wire 15 in the austenitic state 78 has a contracted length 53 shorter than the extended length 52 by a stroke length 54. The extended length 52 is to increase by a developed slack length 55 (see FIG. 7B) in response to the plurality of break-in cycles of the SMA wire 15.

Figure 8:
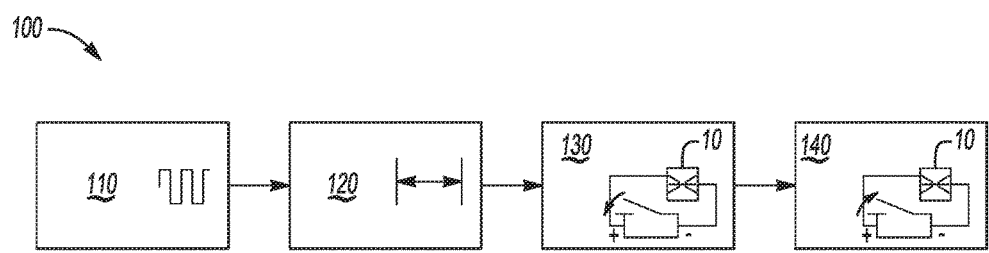
FIG. 8 is a schematic block diagram depicting an example of a method of operating the SMA actuator as disclosed herein.

FIG. 8 is a block diagram depicting a method 100 of operating the SMA actuator 20 as disclosed herein. Block 110 represents cyclically applying an SMA activating electrical current 47 to the SMA wire 15 to cause a cycling of the SMA wire 15 between the martensitic state 77 and the austenitic state 78. Block 120 represents automatically determining that the extended length 52 of the SMA wire 15 has increased by the developed slack length 55. Determining that the developed slack length 55 has been achieved may be in response to an electrical signature (resistance history) of the SMA wire 15, to the timing of the SMA actuator response, some external measurement of tension in the SMA wire 15, or simply a counter which waits for plurality of break-in cycles to elapse. The number of operational cycles to be included as break-in cycles may be empirically determined, or predicted based on characteristics of the SMA wire 15. It may not be necessary to measure the developed slack length 55 in each instance, since SMA wires tend to have consistent operational characteristics from specimen to specimen.

Block 130 represents, in response to the automatically determining (block 120), automatically connecting a circuit of the slack compensator 10 to a source of a releasing electrical current or a retracting electrical current to cause the shuttle 37 to translate to the second position and be permanently captured at the second position.

Block 140 represents automatically disconnecting the circuit from the source of the releasing electrical current or the retracting electrical current.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 200 mA to about 3 A should be interpreted to include not only the explicitly recited limits of from about 200 mA to about 3 A, but also to include individual values, such as 200 mA, 300 mA, 1500 mA, etc., and sub-ranges, such as from about 200 mA to about 2.5 A; from about 0.5 A to about 3 A, etc. Furthermore, when "about" is utilized to describe a value, this is meant to encompass minor variations (up to +/−10 percent) from the stated value.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A slack compensator configured to be attached to a first SMA wire for removing slack that develops in the first SMA wire during a plurality of break-in cycles, the slack compressor comprising:
    a stator fixedly attachable to a base and including a printed circuit board, the printed circuit board comprising:
        a front side and a back side opposite the front side;
        a first latch pin affixed to the printed circuit board to resiliently protrude from the front side of the printed circuit board; and
        a second latch pin affixed to the printed circuit board to resiliently protrude from the front side of the printed circuit board;
    a shuttle configured to move from a first position on the stator to a second position on the stator, the shuttle comprising:
        a conductive plate having an SMA wire attachment end, the conductive plate being configured to conduct an SMA activating electrical current to the first SMA wire to create Joule heat in the first SMA wire and to cause the first SMA wire to transition from a martensitic state to an austenitic state; and
        an aperture to receive the first latch pin when the shuttle is in the first position and the aperture to receive the second latch pin when the shuttle is in the second position; and
    a retraction wire mechanically connected to the stator and to the shuttle, the retraction wire including a second SMA wire, wherein:
    the shuttle is configured to be released from the first position on the stator to translate into the second position on the stator and permanently remain in the second position on the stator;
    the first SMA wire is cyclable between the martensitic state in which the first SMA wire has an extended length and the austenitic state in which the first SMA wire has a contracted length shorter than the extended length by a stroke length;
    the extended length is configured to increase by a developed slack length in response to the plurality of break-in cycles of the first SMA wire;
    the first latch pin and the second latch pin have centers spaced at the developed slack length;
    the retraction wire is configured to apply a retracting force to the shuttle to urge the shuttle away from the first position on the stator toward the second position on the stator;
    the retracting force is normal to the retraction wire and in a retraction direction defined by a vector from the first latch pin to the second latch pin; and
    the shuttle is retractable from the first position by applying a retracting current to the second SMA wire thereby causing the second SMA wire to contract and to apply the retracting force to move the shuttle to the second position.

2. The slack compensator as defined in claim 1 wherein:
    the first latch pin has a first ramp facing the shuttle;
    the shuttle engages the first ramp when the retraction force is applied by the retraction wire to the shuttle thereby causing the shuttle to translate toward the second latch pin and causing the aperture to disengage from the first latch pin and causing the shuttle to slide over the first latch pin; and
    the second latch pin has a second ramp facing the shuttle to be engaged by a leading edge of the shuttle and to thereby deflect the second latch pin under a crossmember that defines a portion of the aperture, the crossmember to engage and be captured by the second latch pin when the shuttle reaches the second position.

3. The slack compensator as defined in claim 2 wherein at least one of the first latch pin and the second latch pin maintains continuous electrical contact with the shuttle to conduct the SMA activating electrical current to the SMA wire when the shuttle is in the first position, the second position, and when the shuttle is translating between the first and second position.

4. The slack compensator as defined in claim 1 wherein:
    the retraction wire is attached to the stator by a first electrically conductive lug and a second electrically conductive lug;
    the first electrically conductive lug is spaced apart from the second electrically conductive lug by a distance less than a total length of the retraction wire;
    the second SMA wire has a contraction stroke that is less than the developed slack length; and
    the retraction wire causes the shuttle to translate from the first position to the second position by activation of the second SMA wire causing contraction of the second SMA wire by the contraction stroke.

5. A method of operating the slack compensator as defined in claim 1, comprising:
    automatically determining that the extended length of the first SMA wire has increased by the developed slack length;
    in response to the automatically determining, automatically connecting the circuit of the slack compensator to a source of a retracting electrical current to cause the shuttle to translate to the second position and be permanently captured at the second position; and
    automatically disconnecting the circuit from the source of the retracting electrical current.

6. An SMA actuator for operating a device, comprising:
    a base; and
    a shape memory alloy (SMA) wire having a first end and a second end, the first end connected to a movable component of the device and the second end connected to the base via a slack compensator, the SMA wire being configured to develop slack in the SMA wire during a plurality of break-in cycles, the slack compensator including:
        a stator fixedly attached to the base;
        a printed circuit board comprising:
            a front side and a back side opposite the front side;
            a solder pad defined on the front side for having a layer of solder disposed thereon;
            a resistor in thermal communication with the solder pad, the resistor to generate heat to melt the layer of solder on the solder pad in response to a releasing current of about 2 Amperes of electrical current being conducted through the resistor;
            a conductive circuit trace disposed on the printed circuit board to conduct the releasing current to the solder pad; and
            a latch pin affixed to the printed circuit board to protrude from the front side of the printed circuit board; and a shuttle configured to move from a first position on the stator to a second position on the stator, the shuttle comprising:
  a conductive plate having an SMA wire attachment end and a retraction spring attachment end;
  a solder attachment surface;
  a flexible electrical conductor to conduct an SMA activating electrical current to the SMA wire to create Joule heat in the SMA wire and to cause the SMA wire to transition from a martensitic state to an austenitic state; and
  an aperture to receive the latch pin when the shuttle is in the second position, wherein:
the SMA actuator is configured to cause the movable component to move in response to a cycling of the SMA wire between the martensitic state in which the SMA wire has an extended length and an austenitic state in which the SMA wire has a contracted length shorter than the extended length by a stroke length; and
the extended length is to increase by a developed slack length in response to the plurality of break-in cycles of the SMA wire;
the shuttle is configured to be released from the first position on the stator to translate into the second position on the stator and permanently remain in the second position on the stator;
the shuttle in the second position is configured to compensate for the developed slack by drawing the SMA wire taut in the martensitic state;
a retraction spring is connected to the stator and to the shuttle at the retraction spring attachment end;
the retraction spring is an extension spring;
the retraction spring is to apply tension to the shuttle to urge the shuttle away from the first position on the stator toward the second position on the stator;
the shuttle is bonded to the stator in the first position by the layer of solder when the solder is in a solid state; and
the shuttle is releasable from the first position by applying the releasing current via the conductive circuit trace to melt the solder thereby allowing the shuttle to move to the second position.

7. A method of operating the SMA actuator as defined in claim 6, comprising:

cyclically applying an SMA activating electrical current to the SMA wire to cause a cycling of the SMA wire between the martensitic state and the austenitic state;
automatically determining that the extended length of the SMA wire has increased by the developed slack length;
in response to the automatically determining, automatically connecting a circuit of the slack compensator to a source of a releasing electrical current to cause the shuttle to translate to the second position and be permanently captured at the second position; and
automatically disconnecting the circuit from the source of the releasing electrical current.

8. A method of operating an SMA actuator for operating a device comprising:

cyclically applying an SMA activating electrical current to an SMA wire to cause a cycling of the SMA wire between a martensitic state in which the SMA wire has an extended length and an austenitic state in which the SMA wire has a contracted length shorter than the extended length by a stroke length, wherein the SMA wire has a first end and a second end, the first end being connected to a movable component of the device and the second end being connected to a base of the SMA actuator via a slack compensator;
increasing the extended length of the SMA wire by a developed slack length during the cyclically applying;
automatically determining that the extended length of the SMA wire has increased by the developed slack length;
in response to the automatically determining, automatically connecting a circuit of the slack compensator to a source of a releasing electrical current or a retracting electrical current, wherein the slack compensator includes a stator fixedly attached to the base and a shuttle configured move from a first position on the stator to a second position on the stator;
in response to the connecting, causing the shuttle to translate from the first position to the second position and be permanently captured at the second position to compensate for the developed slack by drawing the SMA wire taut in the martensitic state; and
automatically disconnecting the circuit from the source of the releasing electrical current or the retracting electrical current.

* * * * *